(12) United States Patent
Broumas

(10) Patent No.: US 10,073,985 B2
(45) Date of Patent: Sep. 11, 2018

(54) APPARATUS AND METHOD FOR TRUSTED EXECUTION ENVIRONMENT FILE PROTECTION

(71) Applicant: Samsung Electronics Co., Ltd., Suwon-si, Gyeonggi-do (KR)

(72) Inventor: Antonios Dimitrios Broumas, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 222 days.

(21) Appl. No.: 15/051,340

(22) Filed: Feb. 23, 2016

(65) Prior Publication Data

US 2016/0253519 A1  Sep. 1, 2016

Related U.S. Application Data

(60) Provisional application No. 62/126,133, filed on Feb. 27, 2015.

(51) Int. Cl.
*G06F 21/62* (2013.01)
*H04L 9/08* (2006.01)
*G06F 21/60* (2013.01)

(52) U.S. Cl.
CPC ........ *G06F 21/6245* (2013.01); *G06F 21/602* (2013.01); *H04L 9/0866* (2013.01); *G06F 2221/2107* (2013.01)

(58) Field of Classification Search
CPC .................................................. G06F 21/6245
USPC ......................................................... 713/189
See application file for complete search history.

(56) References Cited

U.S. PATENT DOCUMENTS

2002/0128969 A1* 9/2002 Parmelee ............. G06Q 20/108
705/42
2010/0223057 A1* 9/2010 Capman .................. G10L 17/02
704/250

* cited by examiner

*Primary Examiner* — Jacob Lipman
(74) *Attorney, Agent, or Firm* — Jefferson IP Law, LLP

(57) ABSTRACT

An apparatus and method for securing sensitive data on a mobile device are provided. The method includes receiving an encryption or decryption request for the sensitive data on the mobile device, forwarding a file access request for the sensitive data to a secure environment, instantiating a trusted user interface (TUI), collecting user input via the TUI, generating a key using the collected user input, and encrypting or decrypting the sensitive data on the mobile device.

29 Claims, 6 Drawing Sheets

APPARATUS AND METHOD FOR TRUSTED EXECUTION ENVIRONMENT FILE PROTECTION

CROSS-REFERENCE TO RELATED APPLICATION(S)

This application claims the benefit under 35 U.S.C. § 119(e) of a U.S. Provisional application filed on Feb. 27, 2015 in the U.S. Patent and Trademark Office and assigned Ser. No. 62/126,133, the entire disclosure of which is hereby incorporated by reference.

TECHNICAL FIELD

The present disclosure relates to an apparatus and method for securing sensitive data on a mobile device. More particularly, the present disclosure relates to an apparatus and method for encrypting sensitive data on a mobile device and securing the encryption key.

BACKGROUND

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

A number of applications on a mobile terminal may contain, receive, or generate sensitive data. Mobile terminals may also download applications (e.g., either legitimate or unintentional malware) which should have user-controlled access to data stored on the mobile terminal. Mobile terminals are easily lost or stolen. A user may also trade-in a mobile terminal without erasing data.

Accordingly, there is a need for an apparatus and method for securing sensitive data on a mobile terminal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for securing sensitive data on a mobile device.

In accordance with an aspect of the present disclosure, a method for securing sensitive data on a mobile device is provided. The method may include receiving an encryption or decryption request for the sensitive data on the mobile device, forwarding a file access request for the sensitive data to a secure environment, instantiating a trusted user interface (TUI), collecting user input via the TUI, generating a key using the collected user input, and encrypting or decrypting the sensitive data on the mobile device.

In accordance with another aspect of the present disclosure, an apparatus for securing sensitive data on a mobile device is provided. The apparatus may include memory in a secure environment on the mobile device, the memory storing executable instructions for securing sensitive data, a display for displaying a screen of a trusted user interface (TUI) on the mobile device, and a processor in the secure environment on the mobile device. The processor may be configured to execute the stored instructions to receive an encryption or decryption request for the sensitive data on the mobile device, forward a file access request for the sensitive data to a secure environment, instantiate the TUI, collect user input via the TUI, generate a key using the collected user input, and encrypt or decrypting the sensitive data on the mobile device.

In accordance with yet another aspect of the present disclosure, an article of manufacture for securing sensitive data on a mobile device is provided. The article of manufacture may include at least one non-transitory computer processor readable storage medium and instructions stored on the at least one non-transitory computer processor readable storage medium, wherein the instructions are configured to be readable from the at least one non-transitory computer processor readable storage medium by at least one computer processor. The instructions may thereby cause the at least one computer processor to operate so as to receive an encryption or decryption request for the sensitive data on the mobile device, forward a file access request for the sensitive data to a secure environment, instantiate a trusted user interface (TUI), collect user input via the TUI, generate a key using the collected user input, and encrypt or decrypt the sensitive data on the mobile device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
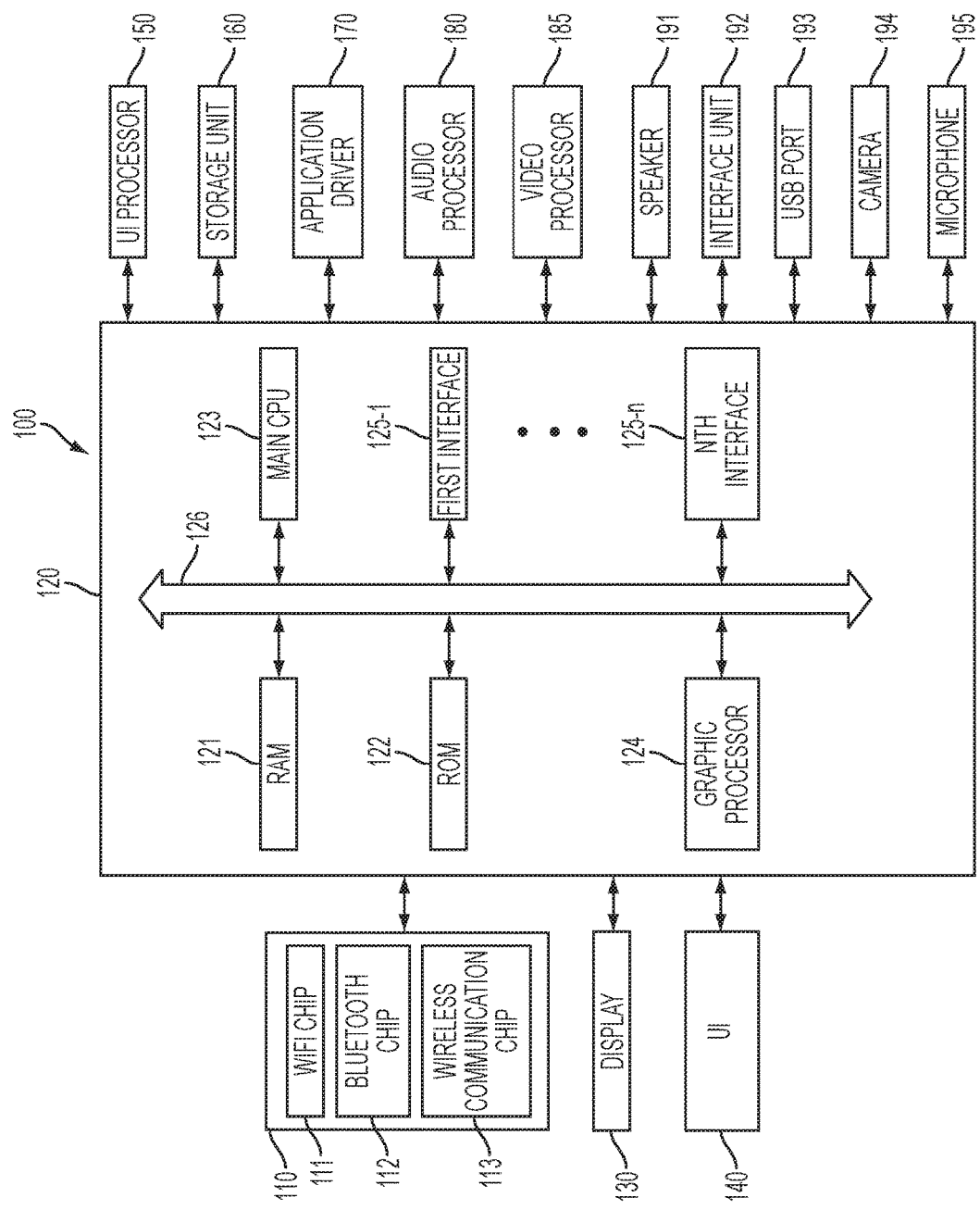
FIG. 1 illustrates a block diagram of the terminal device according to various embodiments of the present disclosure.

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic Appcessory® (e.g., a physical device and counterpart application for a mobile device, such as a toy or fitness product associated with a mobile device application), an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include an apparatus and method for adding security to a mobile telephone.

Various aspects of the present disclosure are novel in that they incorporate a Trusted User Interface (TUI) throughout and in that they mandate user interaction for all file access operations.

According to further aspects of the present disclosure, the user is in control of file access at all times. According to various aspects of the present disclosure, all normal world (vs. secure world) software based attacks are thwarted by TEE processing and TUI leveraging as well as having the encryption key generated on the fly at all times.

Confidential files present in a mobile device require a higher level of security than simply unlocking a screen or entering a privileged mode of operation by providing a system wide password. They should always be stored encrypted and read and write access should be controlled by file specific trusted user input. All cryptographic operations should be executed in a Trusted Execution Environment and input should be collected using a TUI.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

FIG. 1 illustrates a block diagram of the terminal device according to various embodiments of the present disclosure.

Referring to FIG. 1, the user terminal device 100 includes a communication device 110, the controller 120, the display 130, a user interface (UI) 140, a UI processor 150, a storage unit 160, an application driver 170, an audio processor 180, a video processor 185, a speaker 191, an interface unit 192, a USB port 193, a camera 194, and a microphone 195.

The communication device 110 performs communication functions with various types of external apparatuses. The communication device 110 may include various communication chips such as a Wireless Fidelity (WiFi) chip 111, a Bluetooth® chip 112, a wireless communication chip 113, and so forth. The WiFi chip 111 and the Bluetooth® chip 112 perform communication according to a WiFi standard and a Bluetooth® standard, respectively. The wireless communication 113 chip performs communication according to various communication standards such as Zigbee®, 3rd Generation (3G), 3rd Generation Partnership Project (3GPP), Long Term Evolution (LTE), and so forth. In addition, the communication device 110 may further include an Near Field Communication (NFC) chip that operates according to a NFC method by using bandwidth from various RF-ID frequency bands such as 135 kHz, 13.56 MHz, 433 MHz, 860~960 MHz, 2.45 GHz, and so on.

The operation of the controller 120 reads a computer readable medium and performs instructions according to the computer readable medium, which is stored in the storage unit 160. The storage unit 160 may also store various data such as Operating System (O/S) software, applications, multimedia content (e.g., video files, music files, etc.), user data (documents, settings, etc.), and so forth.

Other software modules which are stored in the storage unit 160 will be described later with reference to FIG. 1.

The UI 140 is an input device configured to receive user input and transmit a user command corresponding to the user input to the controller 120. For example, the UI 140 may be implemented by any suitable input such as touch pad, a key pad including various function keys, number keys, special keys, text keys, or a touch screen, for example. In some embodiments, UI 140 may be a TUI implemented as part of or securely integrated with a secure environment (e.g., a trusted execution environment). Accordingly, the UI 140 receives various user commands. For example, the UI 140 may receive a user command for file access or inputting data used for generation of a key.

The UI processor 150 may process and generate various UI screens in 2D or 3D form. Herein, the UI screen may be a screen which is associated with the execution of the integrated wish-list application as described above. In addition, the UI screen may be a screen which displays text or diagrams such as a menu screen, a warning sentence, a time, a channel number, etc.

Further, the UI processor 150 may perform operations such as 2D/3D conversion of UI elements, adjustment of transparency, color, size, shape, and location, highlights, animation effects, and so on.

The storage unit 160 is a storage medium that stores various computer readable mediums that are configured to operate the user terminal device 100, and may be realized as any suitable storage device such as a Hard Disk Drive (HDD), a flash memory module, and so forth. For example, the storage unit 160 may comprise a Read Only Memory (ROM) for storing programs to perform operations of the controller 120, a Random Access Memory (RAM) 121 for temporarily storing data of the controller 120, and so forth. In addition, the storage unit 160 may further comprise Electrically Erasable and Programmable ROM (EEPROM) for storing various reference data.

The application driver 170 executes applications that may be provided by the user terminal device 100. Such applications are executable and perform user desired functions such as playback of multimedia content, messaging functions, communication functions, display of data retrieved from a network, and so forth.

The audio processor 180 is configured to process audio data for input and output of the user terminal device 100. For example, the audio processor 180 may decode data for playback, filter audio data for playback, encode data for transmission, and so forth.

The video processor 185 is configured to process video data for input and output of the user terminal device 100. For example, the video processor 185 may decode video data for playback, scale video data for presentation, filter noise, convert frame rates and/or resolution, encode video data input, and so forth.

The speaker 191 is provided to output audio data processed by the audio processor 180 such as alarm sounds, voice messages, audio content from multimedia, audio content from digital files, and audio provided from applications, and so forth.

The interface unit 192 may be configured based on the user terminal device 100 and include any suitable input mechanism such as a mechanical button, a touch pad, a wheel, and so forth. The interface unit 192 is generally on a particular position of the user terminal device 100, such as on the front, side, or rear of the external surface of the main body. For example, a button to turn the user terminal device 100 on and off may be provided on a side.

The USB port 193 may perform communication with various external apparatuses through a USB cable or perform recharging. In other examples, suitable ports may be included to connect to external devices such as an 802.11 Ethernet port, a proprietary connector, or any suitable connector associated with a standard to exchange information.

The camera 194 may be configured to capture (i.e., photograph) an image as a photograph or as a video file (i.e., movie). The camera 194 may include any suitable number of cameras in any suitable location. For example, the user terminal device 100 may include a front camera and rear camera.

The microphone 195 receives a user voice or other sounds and converts the same to audio data. The controller 120 may use a user voice input through the microphone 195 during an audio or a video call, or may convert the user voice into audio data and store the same in the storage unit 160.

When the camera 194 and the microphone 195 are provided, the controller 120 may receive based on a speech input into the microphone 195 or a user motion recognized by the camera 194. Accordingly, the user terminal device 100 may operate in a motion control mode or a voice control mode. When the user terminal device 100 operates in the motion control mode, the controller 120 captures images of a user by activating the camera 194, determines if a particular user motion is input, and performs an operation according to the input user motion. When the user terminal device 100 operates in the voice control mode, the controller 120 analyzes the audio input through the microphone and performs a control operation according to the analyzed audio.

In addition, various external input ports are provided to connect to various external terminals such as a headset, a mouse, a Local Area Network (LAN), etc., may be further included.

Generally, the controller 120 controls overall operations of the user terminal device 100 using computer readable mediums that are stored in the storage unit 160.

For example, the controller 120 may initiate an application stored in the storage unit 160, and execute the application by displaying a UI to interact with the application. In other examples, the controller 120 may playback media content stored in the storage unit 160 and may communicate with external apparatuses through the communication device 110.

Specifically, the controller 120 comprises a RAM 121, a ROM 122, a main CPU 123, a graphic processor 124, a first to nth interfaces 125~1~125-n, and a bus 126. In some examples, the components of the controller 120 may be integral in a single packaged integrated circuit. In other examples, the components may be implemented in discrete devices (e.g., the graphic processor 124 may be a separate device).

The RAM 121, the ROM 122, the main CPU 123, the graphic processor 124, and the first to nth interfaces 125~1~125-n may be connected to each other through a bus 126.

The first to nth interfaces 125~1~125-n are connected to the above-described various components. One of the interfaces may be a network interface which is connected to an external apparatus via the network.

The main CPU 123 accesses the storage unit 160 and to initiate a booting process to execute the O/S stored in the storage unit 160. After booting the O/S, the main CPU 123 is configured to perform operations according to software modules, contents, and data stored in the storage unit 160.

The ROM 122 stores a set of commands for system booting. If a turn-on command is input and power is supplied, the main CPU 123 copies an O/S stored in the storage unit 160 onto the RAM 121 and boots a system to execute the O/S. Once the booting is completed, the main CPU 123 may copy application programs in the storage unit X60 onto the RAM X21 and execute the application programs.

The graphic processor 124 is configured to generate a screen including objects such as, for example an icon, an image, and text using a computing unit (not shown) and a rendering unit (not shown). The computing unit computes property values such as coordinates, shape, size, and color of each object to be displayed according to the layout of the screen using input from the user. The rendering unit generates a screen with various layouts including objects based on the property values computed by the computing unit. The screen generated by the rendering unit is displayed by the display 130.

Albeit not illustrated in the drawing, the user terminal device 100 may further comprise a sensor (not shown) configured to sense various manipulations such as touch, rotation, tilt, pressure, approach, etc. with respect to the user terminal device 100. In particular, the sensor (not shown) may include a touch sensor that senses a touch that may be realized as a capacitive or resistive sensor. The capacitive sensor calculates a touch coordinates by sensing microelectricity provided when the user touches the surface of the display 130, which includes a dielectric coated on the surface of the display 130. The resistive sensor comprises two electrode plates that contact each other when a user touches the screen, thereby allowing electric current to flow to calculate the touch coordinates. As such, a touch sensor may be realized in various forms. In addition, the sensor may further include additional sensors such as an orientation sensor to sense a rotation of the user terminal device 100 and an acceleration sensor to sense displacement of the user terminal device 100.

FIG. 1 illustrates an example of specific elements included in the terminal device 100. However, components the terminal device 100 may be added, omitted, or changed according to the configuration of terminal device. For example, a Global Positioning System (GPS) receiver (not shown) to receive a GPS signal from GPS satellite and calculate the current location of the user terminal device 100, and a Digital Multimedia Broadcasting (DMB) receiver (not shown) to receive and process a DMB signal may be further included.

Figure 2:
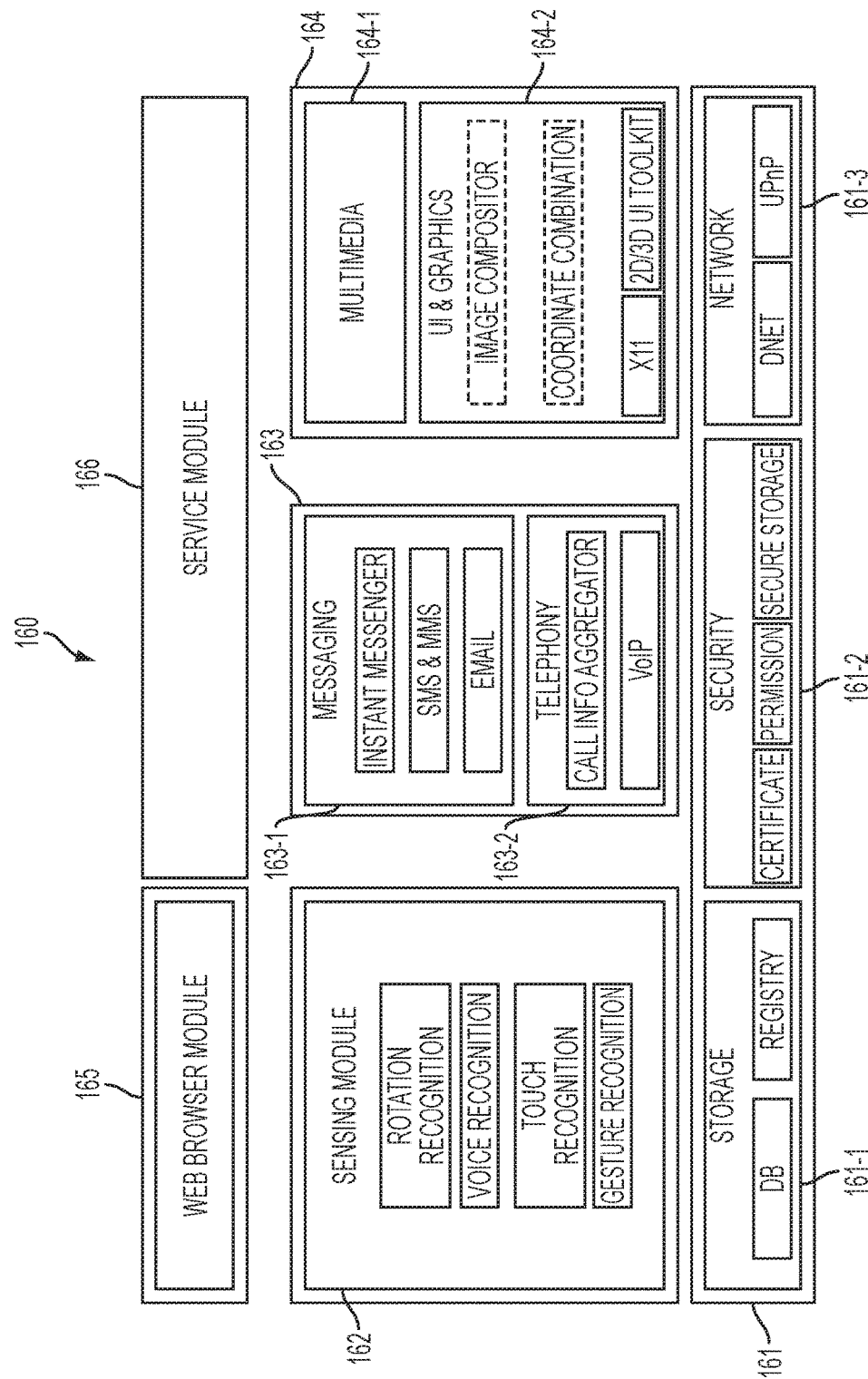
FIG. 2 illustrates a block diagram of software modules in a storage unit 160 according to various embodiments of the present disclosure.

FIG. 2 is a block diagram of software modules in a storage unit 160 according to an embodiment of the present disclosure.

Referring to FIG. 2, the storage unit 160 may store software including a base module 161, a sensing module 162, a communication module 163, a presentation module 164, a web browser module 165, and a service module 166.

The base module 161 refers to a basic module which processes a signal transmitted from hardware included in the user terminal device 100 and transmits the processed signal to an upper layer module. The base module 161 includes a storage module 161-1, a security module 161-2, and a network module 161-3. The storage module 161-1 is a program module including database or registry. The main CPU 123 may access a database in the storage unit 160 using the storage module 161-1 to read out various data. The security module 161-2 is a program module which supports certification, permission, secure storage, etc. with respect to hardware, and the network module 161-3 is a module which supports network connections, and includes a DNET module, a Universal Plug and Play (UPnP) module, and so on.

The sensing module 162 collects information from various sensors, analyzes the collected information, and manages the collected information. The sensing module 162 may include suitable modules such as a face recognition module, a voice recognition module, a touch recognition module, a motion recognition (i.e., gesture recognition) module, a rotation recognition module, and an NFC recognition module, and so forth.

The communication module 163 performs communication with other devices. The communication module 163 may include any suitable module according to the configuration of the user terminal device 100 such as a messaging module 163-1 (e.g., a messaging application), a Short Message Service (SMS) & a Multimedia Message Service (MMS) module, an e-mail module, etc., and a call module 163-2 that includes a call information aggregator program module, a VoIP module, and so forth.

The presentation module 164 composes an image to display on the display 130. The presentation module 164 includes suitable modules such as a multimedia module 164-1 and a UI rendering module 164-2. The multimedia module 164-1 may include suitable modules for generating and reproducing various multimedia contents, screens, and sounds. For example, the multimedia module 164-1 includes a player module, a camcorder module, a sound processing module, and so forth. The UI rendering module 164-2 may include an image compositor module for combining images, a coordinates combination module for combining and generating coordinates on the screen where an image is to be displayed, an X11 module for receiving various events from hardware, a 2D/3D UI toolkit for providing a tool for composing a UI in 2D or 3D form, and so forth.

The web browser module 165 accesses a web server to retrieve data and displays the retrieved data in response to a user input. The web browser module 165 may also be configured to transmit user input to the web server. The web browser module 165 may include suitable modules such as a web view module for composing a web page according to the markup language, a download agent module for downloading data, a bookmark module, a web-kit module, and so forth.

The service module 166 is a module including applications for providing various services. Specifically, the service module 166 may include program modules such as a navigation program, a content reproduction program, a game program, an electronic book program, a calendar program, an alarm management program, other widgets, and so forth.

FIG. 2 illustrates various program modules, but some of the various program modules may be omitted, changed, or added according to the configuration of the user terminal device 100. For example, a location-based module which supports a location-based service in association with hardware such as a GPS receiver may be further included. In another example, a camera 194 may not be included because the user terminal device 100 is configured for a high-security location.

Figure 3:
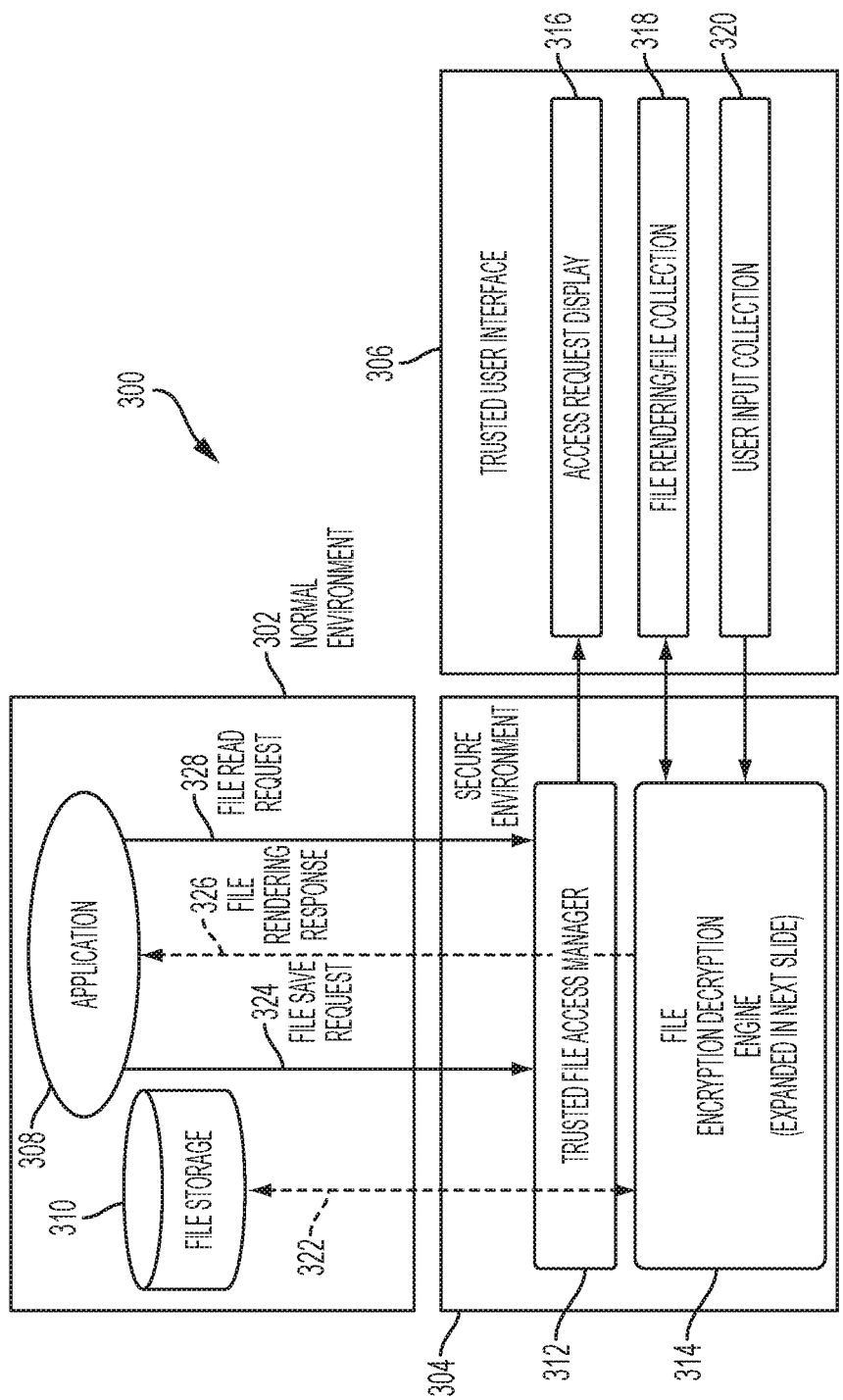
FIG. 3 illustrates a block diagram of file access operations according to various embodiments of the present disclosure.

FIG. 3 illustrates a block diagram of file access operations 300 according to various embodiments of the present disclosure. As illustrated in FIG. 3, a user device may contain a secure environment 304, a normal environment 302, and a TUI 306. In some embodiments, a TUI 306 may be a portion or component of a secure environment 304. In some, embodiments a TUI 306 may be securely interfaced with a secure environment 304 (e.g., via a secure hardware channel, via an encrypted and secure connection, etc.).

Normal environment 302 may be an operating environment used for non-sensitive or less-sensitive data and/or operations. Normal environment 302 may contain file storage 310 which may store data of different levels of security. Data of different levels of security may be stored in different manners (e.g., unencrypted, password protected, different levels of encryption, additional authentication mechanisms associated, etc.). In some embodiments, file storage 310 may separate data of different levels of security in different partitions, directories, or other logical and/or physical patterns of organization. In some embodiments, a user device may contain separate file storage accessible only by a secure environment which may be used for data storage for files of one or more levels of sensitivity. Normal environment 302 may also contain one or more applications 308.

Secure environment 304 may contain a trusted file access manager 312 and a file encryption/decryption engine 314. Secure environment 304 may be a trusted execution environment (TEE) which may use a secure O/S, dedicated secure hardware, and/or other security measures (e.g., an ARM® TrustZone®).

In some embodiments, trusted file access manager 312 may control all file input/out (I/O) to and/or from file storage 310. In some embodiments, trusted file access manager 312 may control file I/O associated with data of one or more levels of sensitivity, data associated with a secure partition, data associated with a secure directory, etc. Trusted file access manager 312 may ensure that confidential files are stored encrypted. Trusted file access manager 312 may securely store or access one or more algorithms for key generation. File encryption keys (FEK) may not be stored and a lack of stored FEKs may increase security. Instead, file encryption/decryption engine 314 may generate keys on demand in a trusted execution environment such as secure environment 304.

In some embodiments, to counter security threats a File Encryption Key (FEK) is not stored in the device. In these embodiments, a FEK may be generated on demand in a Trusted Execution Environment (TEE)(e.g. ARM® TrustZone®). The FEK may be based on user input which may be collected and passed to the Secure World using a Trusted User Interface (TUI). User input and data may be deterministic and they may include noise signal.

In some embodiments, all files may be always stored encrypted. External communication may be secured via a TUI. A user may be notified of every file access attempt. Deliberate user action and/or user specific biometric information and/or other trusted authenticator input may be necessary to generate or regenerate a key used to secure a file.

In one or more embodiments, no key data collection and no key generation or usage will occur in Normal World (e.g., outside of a TEE). Hence, in these embodiments, even if the Normal World part of the device is compromised leakage is thwarted. Even though write and read operations may be initiated by relatively insecure applications, a user's active consent may be necessary for the completion of write and read operations.

As described in further detail in reference to FIG. 4, below, generation of a key by file encryption/decryption engine 314 may be based upon user input which may be collected in secure environment 304 (e.g., if a TUI is part of the secure environment) or may be securely collected and passed to secure environment 304 using TUI 306. User input may be deterministic or include noise signal.

Trusted file access manager 312 and/or file encryption/decryption engine 314 may provide different levels of granularity for encryption. In some embodiments, each portion of data (e.g., a file) may be encrypted with a separate key. Other factors may be considered when determining whether to reuse a key. For example, a key may be used only for encryption or decryption of files within a specified directory, used only for encryption or decryption of files associated with a specified user, used only for encryption or decryption of files associated with a specified application, used only for encryption or decryption of files of a specified type, used only for encryption or decryption of files associated with a specified group, used only for encryption or decryption of files created within a specified geo-location, and used for files created within a specified date range. In some embodiments, a single key may be used for all sensitive data on a device. A level of granularity or reuse of a key may be determined by a user, an administrator, a device manufacturer, a service provider, etc. For example, a user may specify that all files created at a specified geolocation (e.g., determined by sensors of a mobile device to correspond to a specified work location) are sensitive and a specified level of security may be applied.

TUI 306 may contain one or more modules or secure components such as, for example, access request display component 316, file rendering/file collection component 318, and/or user input collection component 320. Access request display component 316 may handle requests via a TUI for access to data. File rendering/file collection component 318 may handle rendering of files for display via a TUI (e.g., via a raw frame buffer that prevents other applications or processes from gaining access to sensitive data). File rendering/file collection component 318 may also collect data input via TUI for creation of a file. For example, file rendering/file collection component 318 may support secure applications or components for creation of files. A secure application may include an application such as a password management application which allows a user to securely enter or retrieve one or more authentication inputs (e.g., passwords, PINs, etc.) via TUI 306. A secure component may include a secure touchpad, camera, microphone, or other sensors connected via TUI 306. User input collection component 320 may collect, via TUI 306, user input used for key generation (e.g., a signature or scribble via touchpad, voice authentication, passwords, PINs, biometrics, etc.).

In some embodiments, all file I/O operations may occur in secure environment 304. Communication with a user may occur through TUI 306. Input through TUI 306 may include input entered by a user via one or more of a touch pad, a microphone, and a camera. Other input and/or sensors may be used.

In some embodiments, write and read operations may be initiated by less secure applications (e.g., applications 308) operating in a normal environment 302, but user's active consent may be necessary for their completion. In other embodiments, read/write operations may be initiated by secure applications operating via TUI 306.

As illustrated in FIG. 3, application 308 may send file read request 328 from normal environment 302 to trusted file access manager 312 operating in secure environment 304. A user may be notified and/or prompted for input via TUI 306. Input entered via TUI 306 (e.g., via user input collection component 320) may be provided to file encryption/decryption engine 314. File encryption decryption engine (as described in further detail with reference to FIG. 4) may generate a key using the input. In some embodiments user input may be non-deterministic and/or noisy and user input collection may include extracting deterministic input (e.g., filtering noise) for use in key derivation. In some embodiments, additional authentication may be required prior to key derivation (e.g., input of biometric authenticators or other input). For example, a user may sign a touch pad and a signature may be used as a key input while signature characteristics may be used as further authentication. In some embodiments, addition input may be used to generate a key. Once a key is generated, file encryption/decryption engine 314 may retrieve (e.g., operation 322) and decrypt a file. In some embodiments, if a user allows it, a decrypted file will be passed to application 308 in normal environment 302 (e.g., operation 326). In some embodiments, a file may be rendered for reading only via TUI 306. Whether decrypted file data is provided outside of a secure environment 304 or TUI 306 may be configurable by a user (e.g., a device owner, administrator, service provider, device manufacturer, etc.) and may depend on one or more factors (e.g., sensitivity of the data, an owner of the data, a creator of the data, a data type, a data range, a current device location, a current device state, etc.). In some embodiments, a length of time data remains decrypted may be configurable or an amount of data decrypted may be configurable. As illustrated in operation 324, an application 308 may also request trusted file access manager 312 for creation of a file.

Figure 4:
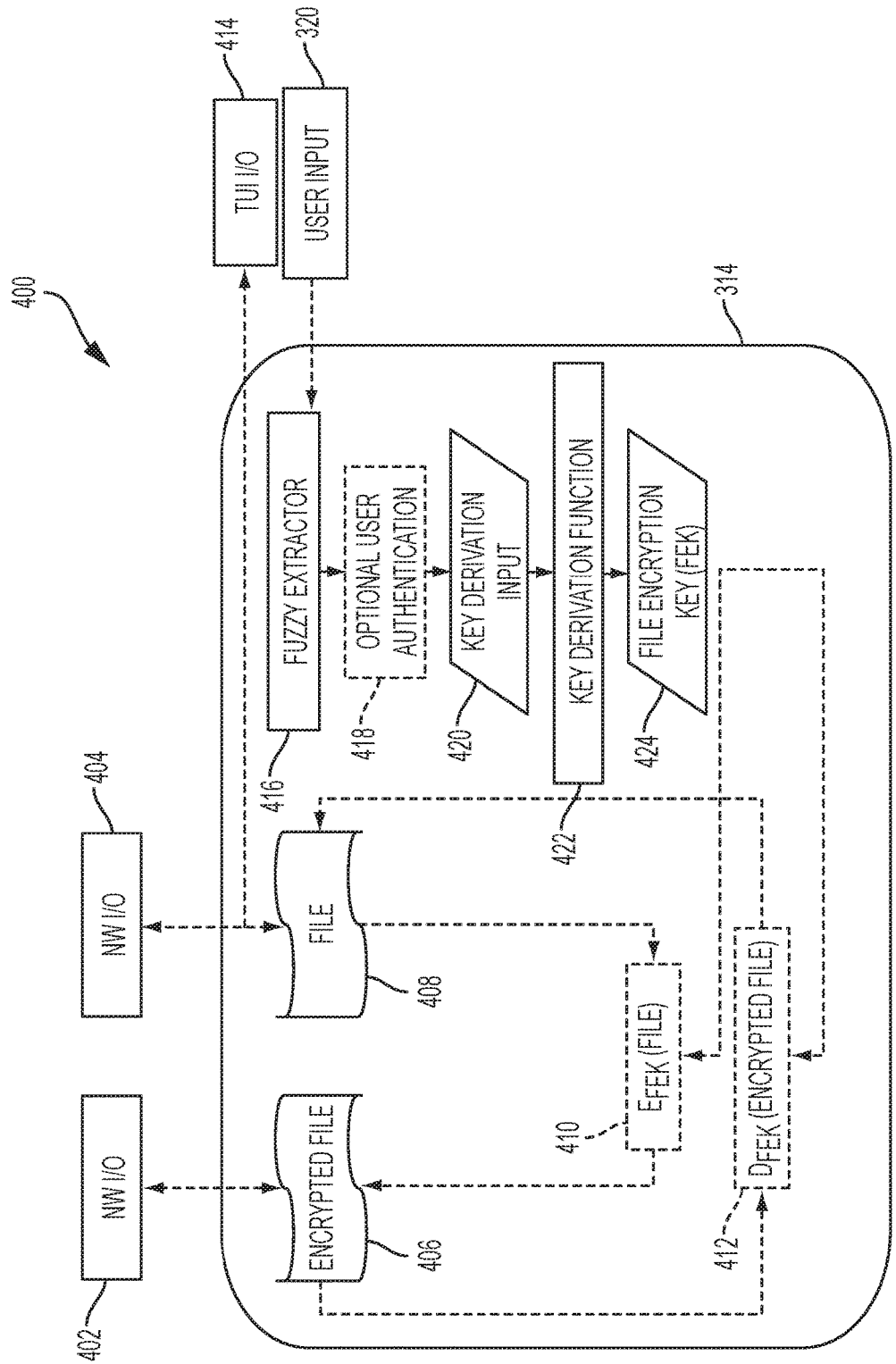
FIG. 4 illustrates a block diagram of file encryption/decryption operations according to various embodiments of the present disclosure.

FIG. 4 illustrates a block diagram of file encryption/decryption operations 400 according to various embodiments of the present disclosure. File encryption/decryption engine 314 may contain a component and/or stored executable instructions for performing fuzzy extraction such as fuzzy extractor 416. Fuzzy extractor 416 may identify a portion of an input (e.g., via user input collection component 320) corresponding to deterministic input which may be used to generate a key. For example, fuzzy extractor 416 may recognize a pattern in a scribbled input on a touchpad, recognize a signature, word, PIN, input via a touchpad, recognize a spoken word input via a microphone, a face captured by a camera, etc. Fuzzy extractor 416 may ensure that that noisy and/or non-deterministic input can be processed to provide deterministic input to generate a key. Prior to non-deterministic input identification, additional user authentication 418 may request additional authentication (e.g., fingerprint input, pulse, iris recognition, facial recognition, signature recognition, voice recognition, a password, etc.). Key derivation input 420 may receive additional factors to generate a key (e.g., characteristics of a handwritten inputted via a touchpad, characteristics of a voice collected via a microphone, etc.) Key derivation function 422 may use inputs provided by a user to generate a file encryption key. A key derivation function may be different for different files or a key derivation function may be the same but input may be different. Whether a different derivation function is used may depend on a level of security needed, a file type, a user associated with a file, a date range, a user request, or other factors. Key derivation function 422 may generate file encryption key (FEK) 424 which may not be stored but may be dynamically generated. If a key is dynamically generated and not stored on a device, physical possession of the device will not suffice for decryption of stored data.

As illustrated, FEK 424 may be used to produce encrypted file 406 via operation 410 or to produce decrypted file 408 via operation 412. As discussed, above whether an encrypted file or a decrypted file is shared outside of a trusted execution environment (e.g., with normal world I/O processes 402 and/or 404) may depend on one or more factors such as, for example, sensitivity of data in a file, a user preference, an application type, a device location, a time of day, etc. A file may also be shared with TUI 414.

Trusted execution environment protection may be integrated with other forms of data protection (e.g., Samsung's Sensitive Data Protection (SDP) that categorizes files as protected and sensitive by adding the new category, confidential). A trusted access manager may also replace an SDP Database having TEE guarantee its integrity and validity of responses. TEE protection can be extended to protect file attributes access, like fstat( ), and directory searches, like find( ). File categorization may be ad hoc or inherited or deduced from characteristic such as directory tree location or ownership or other attributes (e.g., files under /data/private, or owned by admin, or named *.pfx are confidential). In some embodiments, a user's permission input may not be required at all times—for example, state can be kept and limited time lasting permissions may be granted (e.g., remaining unlocked while a device or application is active or for a specified period of time).

Figure 5:
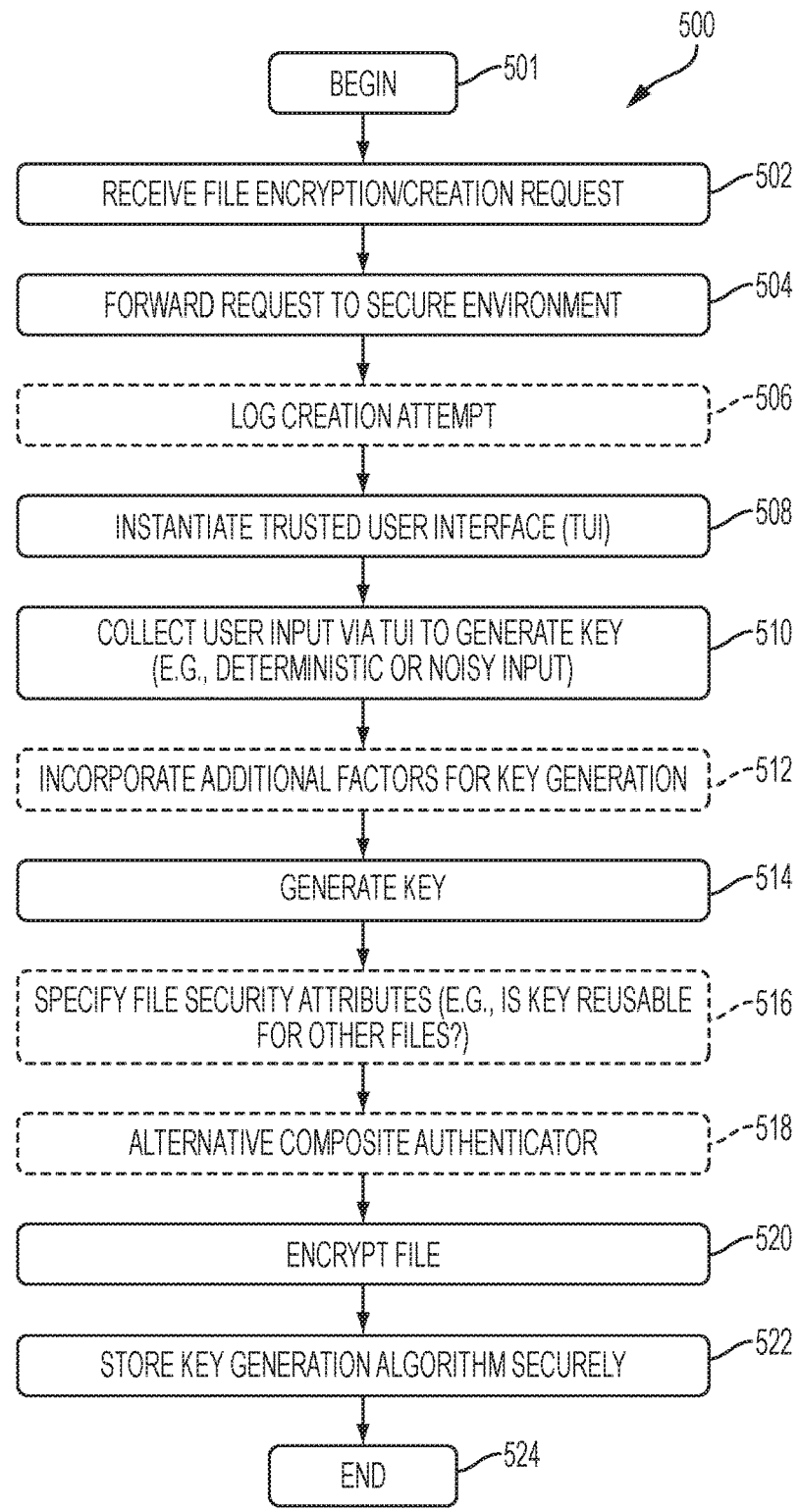
FIG. 5 is a flowchart illustrating a method of encrypting a file, according to various embodiments of the present disclosure.

FIG. 5 is a flowchart illustrating a method of encrypting a file, according to various embodiments of the present disclosure. The method 500 may begin at block 501. At block 502, a file encryption/creation request may be received. A secure file may be created by encrypting an unencrypted file received from a normal environment or by receiving input to create a file via a TUI.

At block 504, the request may be forwarded to a secure environment. According to some embodiments, at block 506, an attempt to create an encrypted file may be logged. As a result of the request, at block 508, a TUI may be instantiated or a user may be prompted via a dialog of an existing TUI.

At block 510, user input may be collected via a TUI. Collected user input may be non-deterministic and/or noisy and may be used to generate a key. Additional factors and/or inputs may be collected prior to key generation at block 512. Additional factors may include other inputs (e.g., biometric data such as fingerprints or facial recognition, a PIN, a password, etc.) or characteristics of a first input (e.g., voice characteristics of a spoken input, handwriting characteristics of a touchpad input, sensor inputs, etc.).

At block 514, a key may be generated. A key may be used to encrypt or decrypt, but in some embodiments a key may not be stored—it may be generated as needed. In some embodiments, it may be persisted only for a specified period of time or according to a specified set of factors (e.g., when a user has chosen to encrypt a plurality of files in a same directory with a same key).

At block 516, one or more file security attributes may be specified. For example, a user (e.g., administrator, device owner, device manufacturer, employer, service provider, etc.) may specify the uniqueness of a key (i.e., whether a key may be reused and according to which factors). For example, a user may specify that files use a same key if they are of a same type, are owned by a same user, are in a same directory, as associated with a same application, were created in a specified time range, etc. File security attributes other than a uniqueness of a key may also be specified. A file security attribute may indicate a sensitivity of data, an expiration period for a key, whether a file may be distributed outside of a trusted execution environment (either in encrypted or unencrypted form), whether a file may be deleted, etc.

At block 518, alternative and/or additional composite authenticators may be specified. For example, sensitivity of a file may require additional authentication such as a fingerprint input, a token, a password, biometric input, etc.

At block 520 a file may be encrypted. At block 522, a key generation algorithm may be stored securely. The method 500 may end at block 524.

Figure 6:
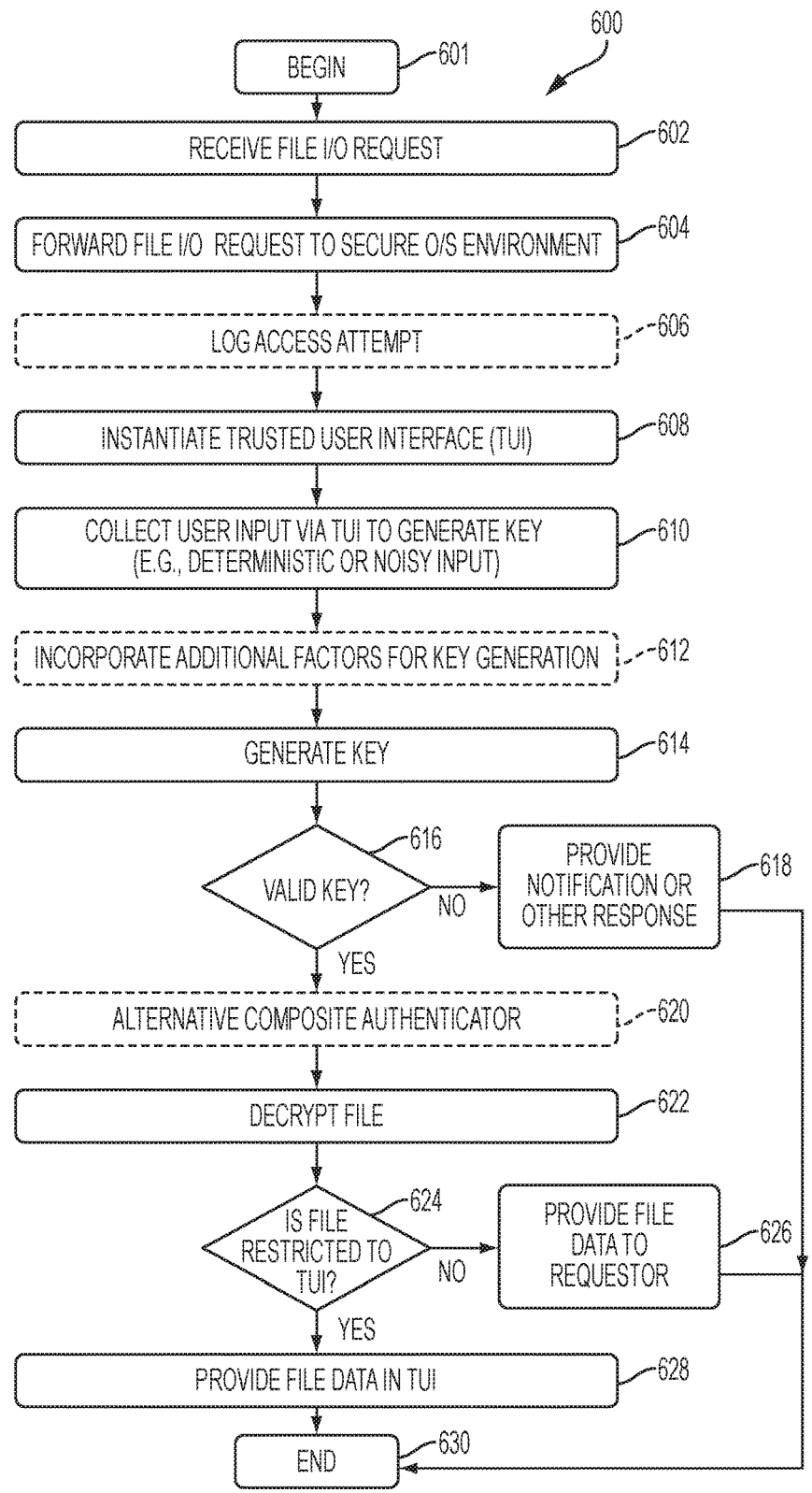
FIG. 6 is a flowchart illustrating a method of decrypting a file, according to various embodiments of the present disclosure.

FIG. 6 is a flowchart illustrating a method 600 of decrypting a file, according to various embodiments of the present disclosure. Method 600 may begin at block 601.

A file I/O request associated with a secure file may be received at block 602. At block 604, the request may be forwarded to a secure environment. In some embodiments, a file I/O request associated with a secure file may be logged at block 606.

At block 608, a TUI may be instantiated or a dialog may be opened in an existing TUI. At block 610, a user input may be collected via the TUI which may be used to generate a key associated with the secure file. The user input may be noisy or non-deterministic. In some embodiments, additional factors may be gathered as input for key generation at block 612. Additional factors may include other inputs (e.g., biometric data such as fingerprints or facial recognition, a PIN, a password, etc.) or characteristics of a first input (e.g., voice characteristics of a spoken input, handwriting characteristics of a touchpad input, sensor inputs, etc.).

At block 614 a key may be generated using the collected input. It may be determined at block 616, whether a generated key is valid. If a generated key is not valid, the method 600 may proceed to block 618. If the generated key is valid the method 600 may proceed to block 620.

At block 618 a notification or other response may be taken based on the invalid key. For example, an administrator may be notified or file I/O requests associated with the secured file may be denied for a period of time. If a valid key is not generated based on the user input, the method 600 may terminate at block 630.

At block 620, if a key is valid, additional authentication may be required using one or more additional composite authenticators.

At block 622, the file may be decrypted.

At block 624, one or more factors may be considered to determine whether a decrypted file is restricted to a TUI or whether it may be provided to an application in a normal world environment (e.g., outside of a TUI and a secure environment). If a file is not restricted, it may be provided to a requester (e.g., an application in a normal world environment) at block 626. If a file is restricted, the file data may be provided via a TUI at block 628. For example, a raw frame buffer may provide access to a user to the decrypted data of a sensitive file via a TUI. At block 630 the method 600 may end.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A method for securing sensitive data on a mobile device, the method comprising:
receiving an encryption or decryption request for the sensitive data on the mobile device;

forwarding, using at least one processor of the mobile device, a file access request for the sensitive data to a secure environment on the mobile device;
instantiating a trusted user interface (TUI);
collecting user input via the TUI;
generating a key using the collected user input in the secure environment on the mobile device; and
performing, using the key, encryption or decryption of the sensitive data on the mobile device.

2. The method of claim 1, further comprising:
deleting the key subsequent to the file access.

3. The method of claim 1, further comprising incorporating one or more additional factors in a key generation algorithm, wherein the one or more additional factors include at least one of a scribble pattern entered via a touchscreen, a handwriting style entered via a touch screen, and voice characteristics of a sound entered via a microphone.

4. The method of claim 1, wherein each portion of the sensitive data is encrypted using a separate key.

5. The method of claim 1, wherein the key is one or more of: used only for encryption or decryption of a file, used only for encryption or decryption of files within a specified directory, used only for encryption or decryption of files associated with a specified user, used only for encryption or decryption of files associated with a specified application, used only for encryption or decryption of files of a specified type, used only for encryption or decryption of files associated with a specified group, used only for encryption or decryption of files created within a specified geo-location, and used for files created within a specified date range.

6. The method of claim 1, further comprising specifying one or more conditions for decrypting the encrypted sensitive data, wherein the one or more conditions comprise an indication of whether decrypted sensitive data may be transmitted outside of the secure environment.

7. The method of claim 1, further comprising:
logging the file access request.

8. The method of claim 1, wherein the user input comprises at least one of a non-deterministic input and a noisy input.

9. The method of claim 8, wherein collecting user input comprises:
processing the non-deterministic or noisy input to produce a deterministic input prior to generating the key, wherein processing non-deterministic or noisy input to produce a deterministic input comprises fuzzy extraction.

10. The method of claim 8, wherein the non-deterministic input comprises input entered by a user via one or more of a touch pad, a microphone, and a camera.

11. The method of claim 1, further comprising specifying one or more conditions for decrypting the encrypted sensitive data, wherein the one or more conditions comprise an indication of whether decrypted sensitive data is only to be displayed via a viewer in the TUI.

12. The method of claim 11, wherein the viewer comprises a raw frame buffer.

13. The method of claim 1, further comprising specifying one or more conditions for decrypting the encrypted sensitive data, wherein the one or more conditions comprise additional authentication required for decryption.

14. The method of claim 13, wherein the additional authentication comprises at least one of fingerprint authentication, iris authentication, handwriting analysis, voice analysis, pulse, biometric input analysis, and facial recognition.

15. The method of claim 13, wherein a level of security required for sensitive data is determined by one or more characteristics of the sensitive data.

16. The method of claim 13, further comprising:
receiving additional authentication input prior to generating the key; and
cancelling generation of the key if the additional authentication input is incorrect.

17. The method of claim 13, further comprising:
if the user input is incorrect, providing a security response.

18. The method of claim 17, wherein the security response comprises one or more of a notification to an owner of the mobile device, providing a notification to an administrator, and locking a mobile device.

19. The method of claim 1, wherein a length of time the sensitive data remains decrypted is configurable.

20. The method of claim 19, wherein the sensitive data remains decrypted for at least one of: a duration of a session, a period of time specified by a user, while a device remains unlocked, while a device remains in a specified geo-location, and while an application associated with the sensitive data remains open.

21. An apparatus for securing sensitive data on a mobile device, the apparatus comprising:
memory in a secure environment on the mobile device, the memory storing executable instructions for securing sensitive data;
a display for displaying a screen of a trusted user interface (TUI) on the mobile device;
a processor in the secure environment on the mobile device, wherein the processor is configured to execute the stored instructions to:
receive an encryption or decryption request for the sensitive data on the mobile device,
forward a file access request for the sensitive data to the secure environment on the mobile device,
instantiate the TUI,
collect user input via the TUI,
generate a key using the collected user input in the secure environment on the mobile device, and
encrypt or decrypt, using the key, the sensitive data on the mobile device.

22. The apparatus of claim 21, wherein the key is not stored subsequent to the file access.

23. The apparatus of claim 21, wherein the processor is further configured to:
process non-deterministic or noisy input to produce a deterministic input, wherein processing non-deterministic or noisy input to produce a deterministic input comprises fuzzy extraction.

24. A non-transitory computer processor readable storage medium including instructions, executable by a processor of a mobile device, stored thereon to perform a method comprising:
receiving an encryption or decryption request for the sensitive data on the mobile device;
forwarding, using the processor of the mobile device, a file access request for the sensitive data to a secure environment on the mobile device;
instantiating a trusted user interface (TUI);
collecting user input via the TUI;
generating a key using the collected user input in the secure environment on the mobile device; and
performing, using the key, encryption or decryption of the sensitive data on the mobile device.

25. The non-transitory computer processor readable storage medium of claim 24, wherein the instructions are further configured to cause the processor to:
  delete the key subsequent to the file access.

26. The non-transitory computer processor readable storage medium of claim 24, wherein the user input comprises at least one of a non-deterministic input and a noisy input.

27. The non-transitory computer processor readable storage medium of claim 24, wherein the instructions further comprise:
  processing non-deterministic or noisy input to produce a deterministic input, wherein processing non-deterministic or noisy input to produce a deterministic input comprises fuzzy extraction.

28. The non-transitory computer processor readable storage medium of claim 24, wherein the instructions further comprise:
  specifying one or more conditions for decrypting the encrypted sensitive data, wherein the one or more conditions comprise additional authentication required for decryption.

29. The non-transitory computer processor readable storage medium of claim 24, wherein the instructions further comprise:
  specifying one or more conditions for decrypting the encrypted sensitive data, wherein the one or more conditions comprise an indication of whether decrypted sensitive data may be transmitted outside of the secure environment.

* * * * *